June 19, 1934.  E. K. BAKER  1,963,112
AUTOMOBILE ARM AND ROD CONNECTION
Filed June 26, 1930
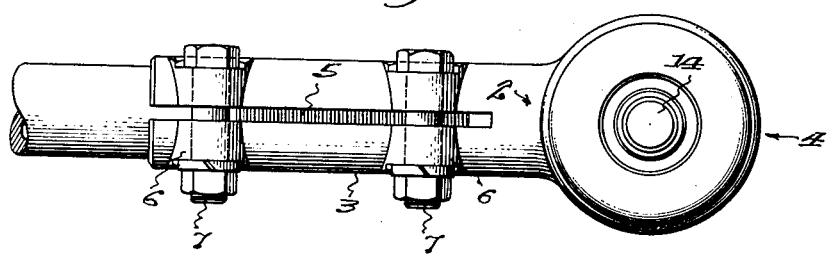
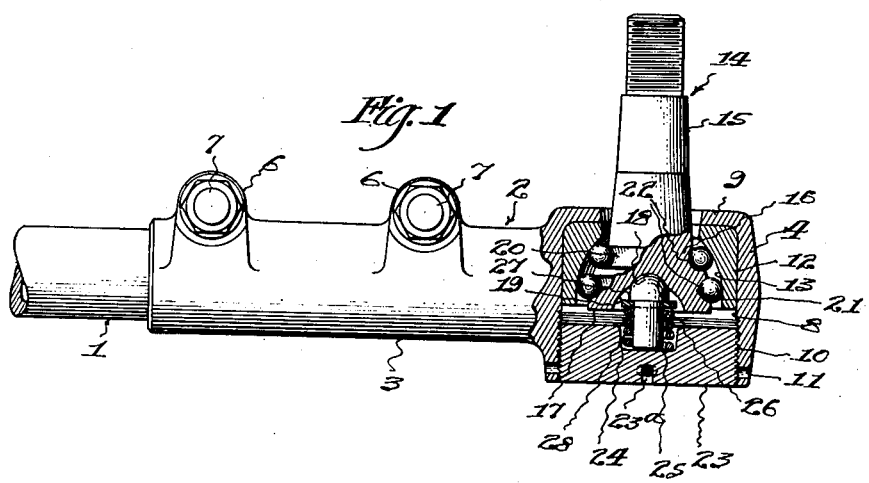
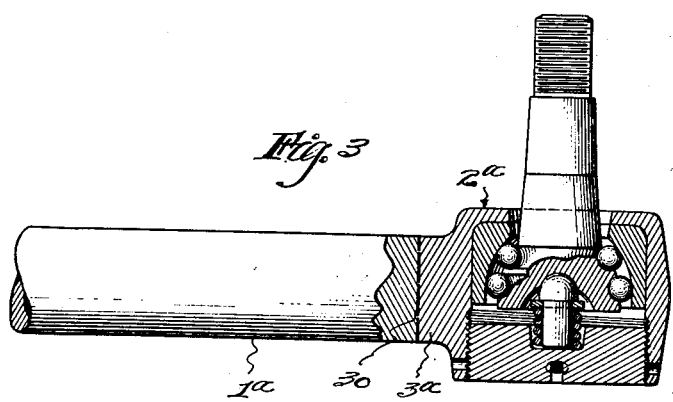
Inventor:
Eric K. Baker
by: Arthur W. Nelson
Atty.

Patented June 19, 1934

1,963,112

UNITED STATES PATENT OFFICE 1,963,112

AUTOMOBILE ARM AND ROD CONNECTION

Erle K. Baker, Chicago, Ill., assignor to Baker Axle Company, Cleveland, Ohio, a corporation of Ohio Application June 26, 1930, Serial No. 463,922

2 Claims. (Cl. 287—90)

This invention relates to improvements in automobile arm and rod connections and it consists of the matters hereinafter described and more particularly pointed out in the appended claims.

The primary object of the invention is to provide a connection especially adapted for use between certain parts of an automobile, as for example, between the knuckle arms and tie rod or link and the like parts associated therewith. The connection is of the anti-friction type and one of the objects of the invention is to provide a structure embodying a plurality of rows of anti-friction bearings between the stud head and associated hemi-spherical bearing surface whereby certain of said elements are better adapted to take up end thrust between the parts and this in a manner without interfering with the oscillating movement that occurs between said parts.

The above mentioned objects of the invention as well as others, together with the many advantages thereof will more fully appear as I proceed with my specification.

In the drawing:—

Fig. 1 is a view in side elevation of one end of a tie rod or link of an automobile embodying the invention, with parts shown in section to more clearly illustrate the same.

Fig. 2 is a top plan view of the same.

Fig. 3 is a view similar to Fig. 1 illustrating a modified form of the invention.

Referring now in detail to that embodiment of the invention, illustrated in Figs. 1 and 2, 1 indicates one end of an automobile tie rod or link which in this instance is a suitable length of tubing. On said rod end is a member 2 which comprises a body 3 and a hollow boss 4. The body 3 surrounds a portion of said rod end and is provided with a longitudinal slot 5 at one side and with pairs of ears 6—6 along said slot to receive bolts 7 by which said member as a whole may be tightly clamped upon the rod end.

The boss 4 has a bore 8 arranged with its axis at a right angle to that of the rod and at one end of the bore is an inwardly extending radial flange 9. The other end of the bore is interiorly threaded as at 10 and is also provided with a plurality of radial openings 11. In the bore 8 and engaged against the flange 9 is a ring 12 having a hemi-spherical, interior bearing surface 13.

14 indicates a stud adapted for attachment to an associated part such as a steering knuckle arm (not shown). Said stud includes a tapered body 15 normally arranged with its major portion outside of the boss 4 and a hemi-spherical head 16 arranged within the boss 4 to coact with the bearing surface 13 of the ring 12 within said boss. The bottom end of said stud head is flat as at 17 and in said bottom end is a hemi-spherical recess 18 that communicates with a larger recess 19 that opens through said flat bottom end of the head. Said head is provided with two annular grooves 20 and 21 respectively of different diameters, both arranged on the same side of the center of said head which is the center of the recess 18 and this center is substantially coincident with the center of the bearing surface 13. In both grooves are located anti-friction elements 22 in the form of balls which engage with said bearing surface 13.

The interiorly threaded bottom end of the boss is adapted to receive a nut 23 for closing said end of the boss. In the top surface of said nut is an axial recess 24 to accommodate a stem 25 having a hemi-spherical top end 26 fitting in the recess 18 of the head and on said stem near said top end is a radial flange 27. A helical spring 28 surrounds the stem and engages both the flange 27 and bottom of the recess 23 whereby the head is yieldingly supported in a position wherein the anti-friction elements 22 are held in engagement with the bearing surface 13 of the ring 12.

In the assembly of the connection, after the ring 12 and stud and anti-friction elements have been properly positioned and the stem 25 and spring 28 have been properly located, the nut 23 is then screwed up tight into the bottom end of the boss to bring the head of the stem into snug engagement with the recess 18 in said head after which the nut is backed away usually about an eighth of a turn to bring an opening 23ª in said nut into register with desired openings 11 in the boss after which the nut is locked against movement by a pin 29. This provides an ideal adjustment for the parts so that the stud may freely oscillate without play into any position it becomes necessary to assume. Again, should any wear occur between the parts this may be readily compensated for by screwing up the nut.

By arranging both sets of anti-friction elements above or to one side of the center about which the stud head oscillates, the said elements in the groove 20 act more in the nature of thrust bearings but this in no manner detracts from their function as bearings for the oscillating movement that the stud naturally takes on in use.

In Fig. 3 I have illustrated a modified structure wherein the rod 1ª is of a solid cross section and the member 2ª includes a short boss 3ª butt welded as at 30 to the extremity of the rod 1ª. This arrangement provides a reduction in manufacturing cost and materially reduces weight.

Another advantage gained in the mounting of the stud is that the possibility of the displacement of said elements is materially reduced at the widest angle of oscillation of said stud.

The connection described, is practical and consists of but a few parts which may be made and assembled at but a small cost. Again, when such a connection is embodied in the steering mechanism of an automobile, steering is made easier so that the automobile may be at all times retained under control.

While in describing the invention, I have referred in detail to the form and arrangement of the parts thereof, the same is to be considered as illustrative only so that I do not wish to be limited thereto except as may be specifically set forth in the appended claims.

I claim as my invention:—

1. In a tie rod end, a housing formed at one end to retain a bearing member having a spherical inner surface, a stud member having a head with two annular grooves therein, a set of balls arranged in each groove, one set of balls forming a thrust bearing and the other set of balls forming an annular bearing, means engaging said head to hold the balls of both sets in engagement with said spherical inner surface, the arrangement being such as to provide for limited universal movement between said bearing member and said head.

2. In a tie rod end, a housing formed at one end to retain a bearing member having a spherical inner face, a stud member having a head with a plurality of grooves therein, a set of balls arranged in each groove forming thrust and annular bearings, means engaging said head to hold the balls of said sets in engagement with said spherical inner surface, the arrangement being such as to provide for limited universal movement between said bearing member and said head.

ERLE K. BAKER.